US008854638B2

(12) United States Patent
Inoue et al.

(10) Patent No.: US 8,854,638 B2
(45) Date of Patent: Oct. 7, 2014

(54) VARIABLE PRINTING CONTROL APPARATUS AND CONTROL PROGRAM

(75) Inventors: Akira Inoue, Machida (JP); Shigeru Sakamoto, Sagamihara (JP); Hideyuki Yamazaki, Sagamihara (JP)

(73) Assignee: Kinoca Minolta Business Technologies, Inc., Chiyoda-Ku, Tokyo (JP)

( * ) Notice: Subject to any disclaimer, the term of this patent is extended or adjusted under 35 U.S.C. 154(b) by 541 days.

(21) Appl. No.: 12/959,815

(22) Filed: Dec. 3, 2010

(65) Prior Publication Data

US 2011/0141508 A1 Jun. 16, 2011

(30) Foreign Application Priority Data

Dec. 11, 2009 (JP) ................................. 2009-282073

(51) Int. Cl.
*G06F 3/12* (2006.01)
(52) U.S. Cl.
CPC ............ *G06F 3/1284* (2013.01); *G06F 3/1211* (2013.01); *G06F 3/1243* (2013.01); *G06F 3/1244* (2013.01)
USPC ........................................ 358/1.13; 356/1.15
(58) Field of Classification Search
CPC ... G06F 3/1211; G06F 3/1243; G06F 3/1244; G06F 3/1284
USPC ................................................. 358/1.1, 1.13
See application file for complete search history.

(56) References Cited

U.S. PATENT DOCUMENTS 8,345,298 B2 * 1/2013 Ito ................................ 358/1.17
2005/0162676 A1 * 7/2005 Aoki ............................ 358/1.13

FOREIGN PATENT DOCUMENTS

JP 2005-210395 A 8/2005

OTHER PUBLICATIONS

Official Action issued by State Intellectual Property Office of People's Republic of China on Oct. 28, 2013 in Chinese Application No. 201010569563.4, and English language translation of Official Action (12 pgs).

* cited by examiner

*Primary Examiner* — King Poon
*Assistant Examiner* — Iriana Cruz
(74) *Attorney, Agent, or Firm* — Buchanan Ingersoll & Rooney PC

(57) ABSTRACT

A variable printing control apparatus for creating an image data to be printed, using variable printing data containing a plurality of page data in which one of a plurality of parts is arranged in one page, the variable printing control apparatus being configured to implement: a first processing method for rasterizing the plurality of page data, extracting the plurality of parts from each of pieces of raster data, and superimposing the plurality of parts of raster data to create the image data; and a second processing method for converting the plurality of page data into PDL data, extracting the plurality of parts from each of pieces of PDL data, superimposing the plurality of parts of PDL data, and rasterizing the superimposed PDL data to create the image data.

12 Claims, 9 Drawing Sheets

FIG. 1

10: VARIABLE PRINTING SYSTEM

FIG. 2

20: VARIABLE PRINTING CONTROL APPARATUS

FIG. 3

201: PPML ANALYSIS PROCESSING SECTION

FIG. 4

203: PDL LAYOUT EDIT PROCESSING SECTION

PRIOR ART

VARIABLE PRINTING CONTROL APPARATUS AND CONTROL PROGRAM

CROSS REFERENCE TO RELATED APPLICATION

The present application is based on Japanese Patent Application No. 2009-282073 filed with Japanese Patent Office on Dec. 11, 2009, the entire content of which is hereby incorporated by reference.

BACKGROUND OF THE INVENTION

1. Field of the Invention

The present invention relates to a variable printing control apparatus for controlling variable printing, and a control program.

2. Background Technology

Variable printing is a technique of extracting and re-using the common portion wherever possible and replacing the variable section alone, thereby saving the image generation time. In the conventional variable printing, the parts to be used repeatedly (hereinafter referred to as "reusable parts") are rasterized, and are then cached in the internal storage area. After the parts not used repeatedly (hereinafter referred to as "temporarily usable parts") have been rasterized, they are integrated with the cached reusable parts to create a page image. Thus, processing efficiency is enhanced by minimizing the rasterization of reusable parts and transfer of the same data.

In connection with the aforementioned variable printing, for example, the Japanese Unexamined Patent Application Publication No. 2005-210395 (Patent Document 1) discloses an image conversion apparatus wherein the first image data, consisting of the definition of a plurality of image parts and the layout of a plurality of these image parts, representing the printing image across a plurality of pages is converted into the second image data rasterized and divided into several pages. This image conversion apparatus includes:

a first parts layout section which, based on the aforementioned first image data, creates the third image data having the second layout which includes the page wherein a plurality of image parts are arranged, the second layout being different from the layout of the image parts on the aforementioned printing image;

a rasterizing section for generating the fourth image data by rasterizing the third image data; and a second parts layout section which picks up each of the image parts having been rasterized, from the aforementioned fourth image data, and arranges each of the image parts having been picked up to suit the layout for each page of the printing image, whereby the second image data is configured.

In the aforementioned variable printing, when the superimposed parts are stored for each page, the number of the pages to be rasterized will be raised to an enormous level if the number of parts continues to increase. This will drastically reduce the processing efficiency. The processing efficiency will be seriously reduced particularly when the data has a small area of the common portion (reusable parts) and is made up of a great number of parts, or when the data is formed of a great amount of variable parts (temporarily usable parts).

Thus, to enhance the processing efficiency in variable printing, it is preferred not to create the aforementioned data that may reduce the processing efficiency. On the apparatus for controlling variable printing, the user cannot be requested to determine if the data improves the processing efficiency or not. Further, the user may possibly create such data unintentionally. If such data has been inputted, a serious reduction occurs in the processing efficiency, in the conventional art.

In the Patent Document 1, non-reusable parts (temporarily usable parts) are collectively rasterized to upgrade the processing efficiency. Collective rasterization requires a second layout. Further, the internal information on the position and size of the second layout must be created, with the result that processing time and labor will be increased. Superimposition of raster images is essential in the Patent Document 1, and therefore, an increase in the number of parts will also reduce the processing efficiency.

In view of the problems described above, it is the major object of the present invention to provide a variable printing control apparatus and control program wherein processing efficiency is enhanced by a substantial reduction in the number of pages to be rasterized.

SUMMARY

To achieve at least one of the aforementioned object, a variable printing control apparatus reflecting one aspect of the present invention for creating an image data to be printed, using variable printing data containing a plurality of page data in which one of a plurality of parts is arranged in one page, is configured to implement: a first processing method for rasterizing the plurality of page data, extracting the plurality of parts from each of pieces of raster data, and superimposing the plurality of parts of raster data to create the image data; and a second processing method for converting the plurality of page data into PDL data, extracting the plurality of parts from each of pieces of PDL data, superimposing the plurality of parts of PDL data, and rasterizing the superimposed PDL data to create the image data.

A variable printing control apparatus reflecting another aspect of the present invention for creating an image data to be printed, using variable printing data containing a plurality of page data in which one of a plurality of parts is arranged in one page, includes: an analysis processing section which analyzes the variable printing data and selects a processing method in conformity to a form of the plurality of parts; a conversion processing section which converts the page data into PDL data in cases where a specific processing method has been selected; an edit processing section which lays out and edits the converted PDL data, and superimposes the plurality of parts in PDL format; and a RIP processing section which rasterizes the PDL data obtained by superimposing the plurality of parts to create the image data.

The aforementioned analysis processing section preferably selects the aforementioned specific processing method, in cases where a number of the temporarily usable parts is not less than a prescribed value, or in cases where the number is less than the prescribed value and a ratio of total area of the reusable parts with respect to a page area is less than a prescribed ratio.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

In a variable printing job such as a PPML (Personalized Print Markup Language), when parts to be superimposed are loaded on one page, the data having a small area of the common portion (reusable parts) and made up of a great number of parts, and the data made up of a great number of variable parts (temporarily usable parts) require rasterization of the pages corresponding to the number of parts. This signifies a substantial reduction in processing efficiency.

Thus, such data with a low percentage of re-use should be processed by normal printing (PS and PDF (Portable Document Format)), not by variable printing. However, the user can easily create the data of a lower percentage of re-use unintentionally, and the data is outputted in the PPML. Accordingly, if the data is outputted from a printer, the speed will be lower than that in normal printing.

As described above, printing based on the PPML heavily depends on the variable printing layout and data configuration. This means that effective printing can be achieved only when the user has a deep knowledge about the data configuration or layout. To solve this problem, an embodiment of the present invention includes a function that prevents processing efficiency from being reduced when the data of lower percentage of re-use is employed.

To put it more specifically, when the variable printing data has been received, the data is analyzed. If there are a greater quantity of the common portion (reusable parts), the conventional processing method is utilized. When the efficiency is reduced in the conventional processing method, for example, when there are a greater number of variable parts (temporarily usable parts), parts are superimposed in the PDL format. After that, rasterization is performed. This procedure provides a substantial reduction in the number of the pages to be rasterized, and upgrades the processing efficiency.

EXAMPLE

Figure 1:
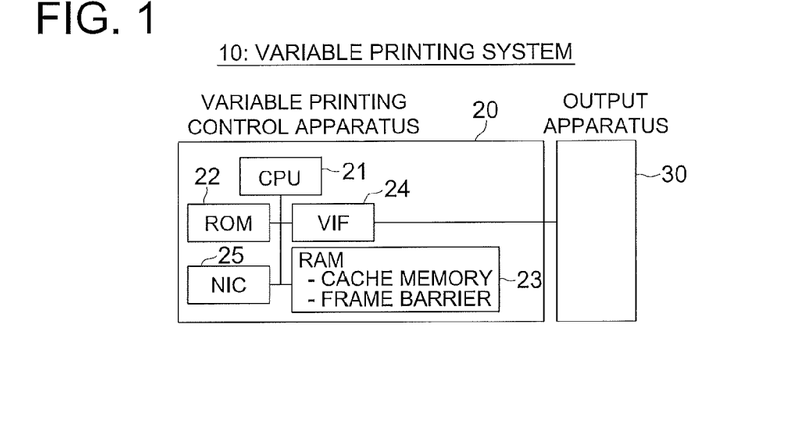
FIG. 1 is a block diagram representing the configuration of a variable printing system in an Example of the present invention.
Figure 2:
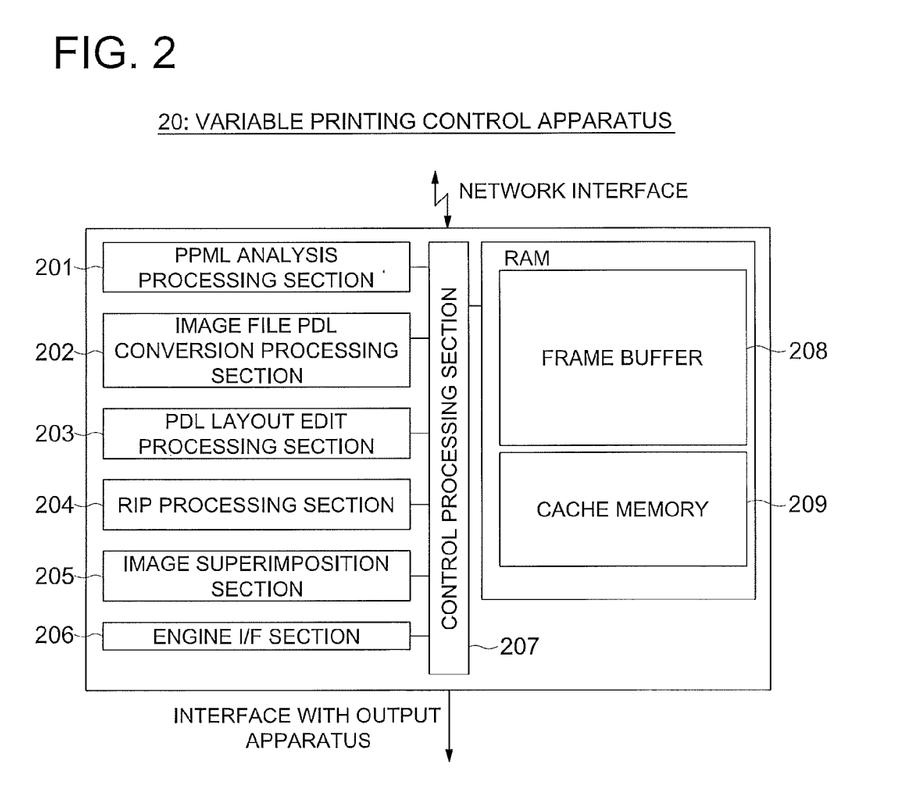
FIG. 2 is a block diagram representing the configuration of the program in a variable printing system in an Example of the present invention.
Figure 3:
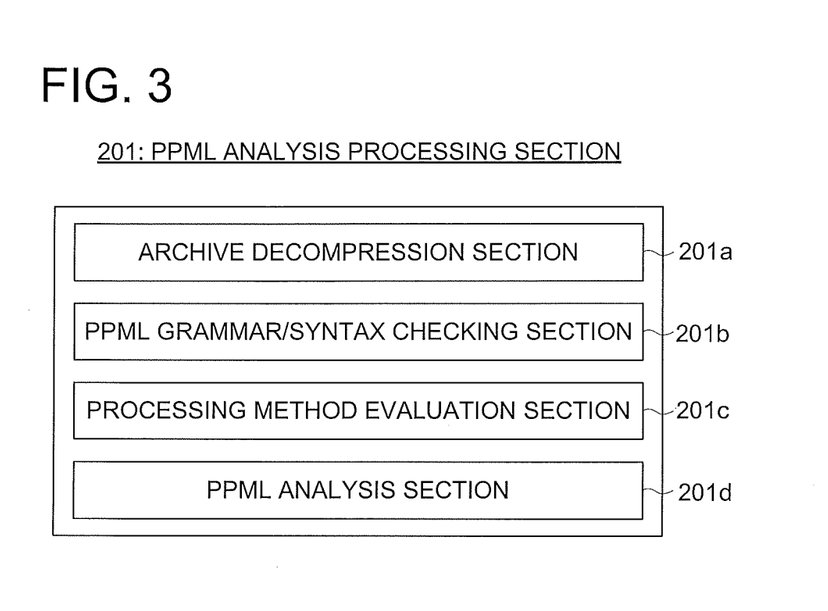
FIG. 3 is a block diagram representing the configuration of a PPML analysis processing section in an Example of the present invention.
Figure 4:
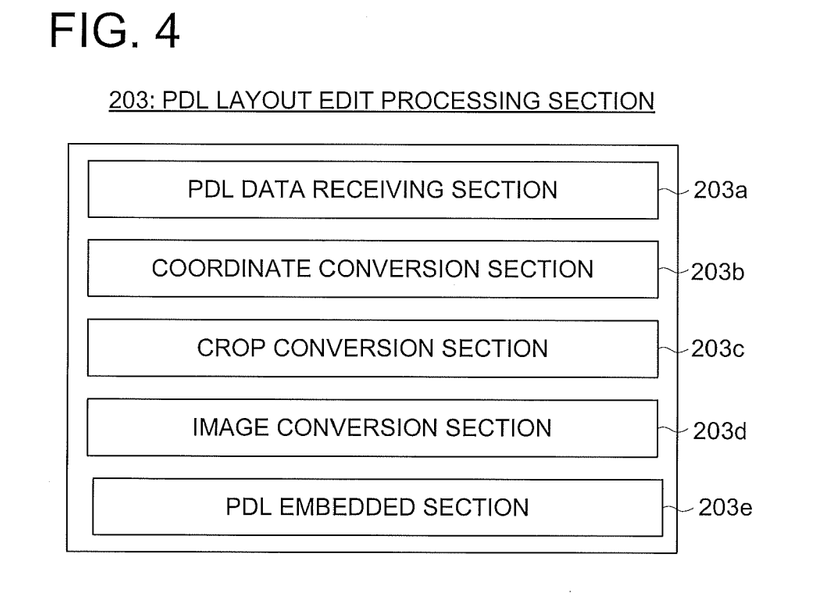
FIG. 4 is a block diagram representing the configuration of the PDL layout edit processing section in an Example of the present invention.
Figure 5:
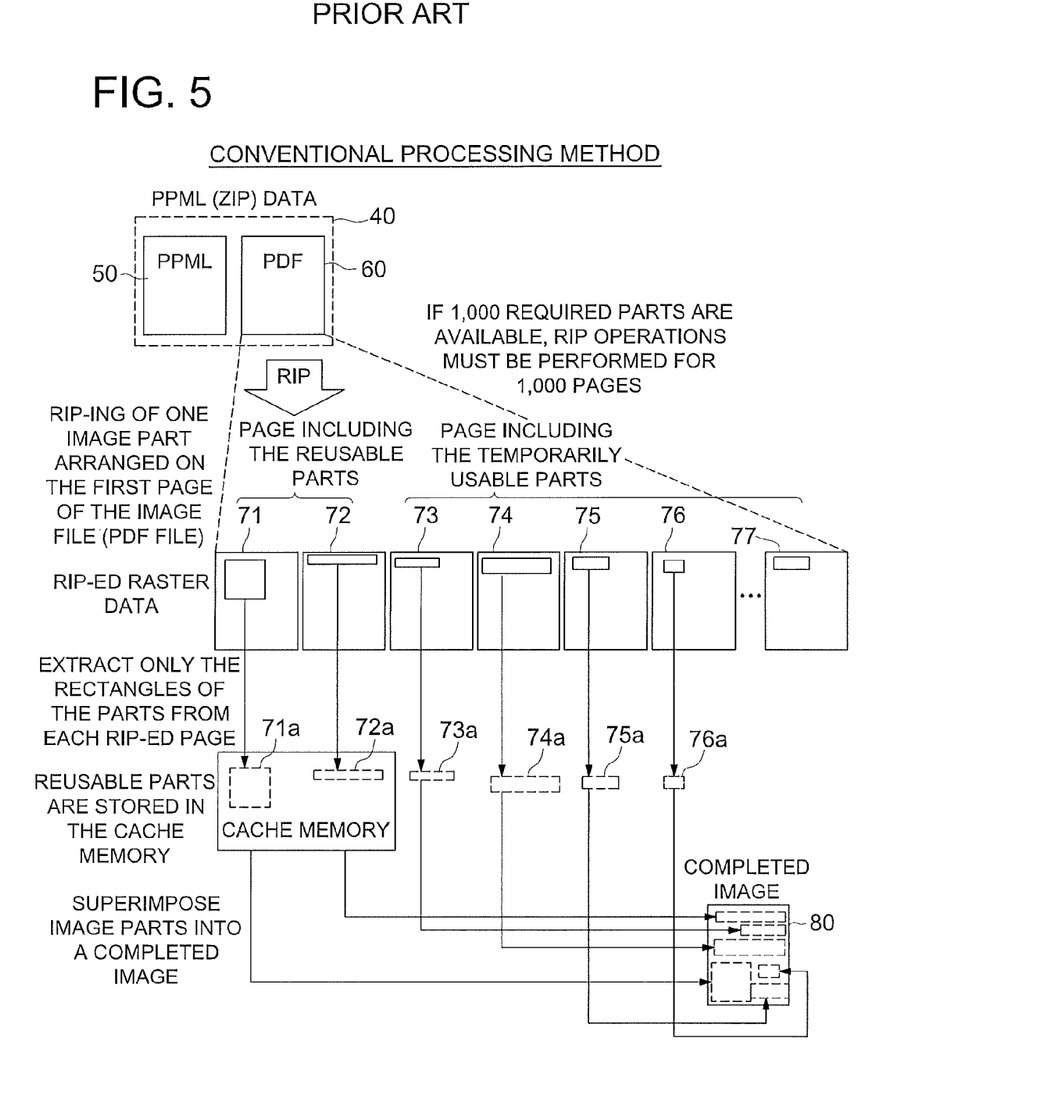
FIG. 5 is a diagram schematically showing the conventional processing method (processing method for superimposing the parts having been rasterized)
Figure 6:
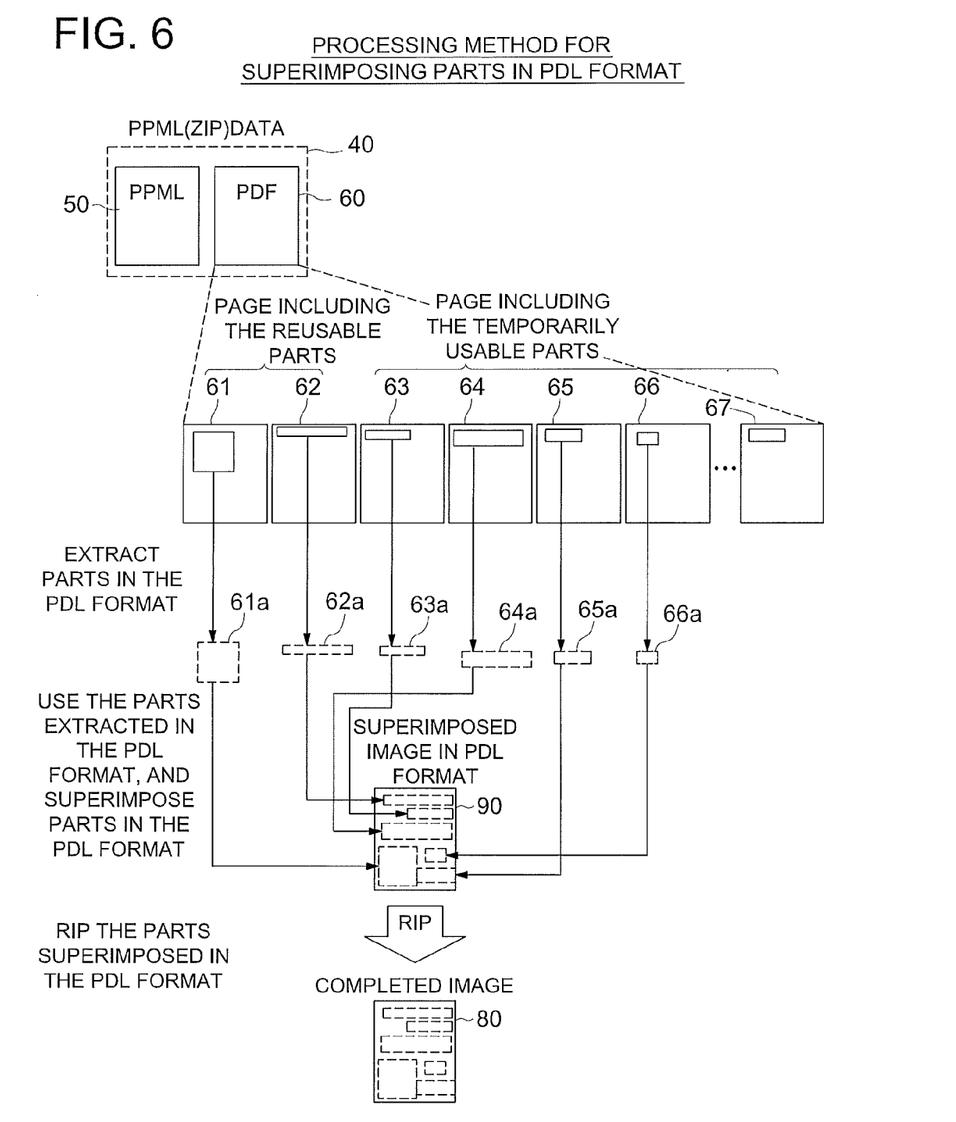
FIG. 6 is a diagram schematically showing the processing method (processing method for superimposing parts in the PDL format) proposed in the present Example.

To give further details of the embodiment of the aforementioned present invention, the following describes the variable printing control apparatus and control program as an Example of the present invention with reference to FIGS. 1 through 11. FIG. 1 is a block diagram representing the configuration of a variable printing system in an Example of the present invention. FIG. 2 is a block diagram representing the configuration of the program in a variable printing system in an Example of the present invention. FIG. 3 is a block diagram representing the configuration of a PPML analysis processing section in an Example of the present invention. FIG. 4 is a block diagram representing the configuration of the PDL layout edit processing section in an Example of the present invention. FIGS. 5 and 6 explain the conventional processing method and the processing method proposed in this Example. FIGS. 7 through 11 are the flow charts showing the processing of the variable printing control apparatus.

As shown in FIG. 1, the variable printing system 10 of this Example includes a variable printing control apparatus 20 for analyzing the printing data of variable language and creating the image data for each page; and an output apparatus 30 for printing according to the image data for each page. The variable printing control apparatus 20 is connected to the client (not illustrated) designating the variable printing, through such a network as the LAN (Local Area Network) and WAN (Wide Area Network). The variable printing control apparatus 20 and output apparatus 30 are connected by a special-purpose interface.

The variable printing control apparatus 20 includes a CPU (Central Processing Unit) 21, ROM (Read Only Memory) 22, RAM (Random Access Memory) 23, VIF (Video Interface) 24, and NIC (Network Interface Card) 25. It expands the program stored in the ROM 22, which is displayed on the RAM 23, and is executed by the CPU 21. The RAM 23 includes a cache memory for storing an object, and a frame buffer area for storing the superimposed images. The VIF 24 is used to transfer the superimposed images to the output apparatus 30.

The output apparatus 30 is an image forming apparatus such as a network printer or multi-functional peripheral.

In FIG. 1, the variable printing control apparatus 20 and output apparatus 30 are represented as being two separate apparatuses, but can be configured as one integral apparatus. Further, the variable printing control apparatus 20 can be provided with an HDD. The object and superimposed image can be stored in the memory or HDD of another apparatus linked to the variable printing control apparatus 20.

FIG. 2 is a diagram representing the configuration of the program in a variable printing system 20. The system includes a program that allows the computer to operate as a PPML analysis processing section 201, image file PDL conversion processing section 202, PDL layout edit processing section 203, RIP (Raster Image Processor) processing section 204, image superimposition section 205, engine I/F section 206, and control processing section 207.

The PPML analysis processing section 201 compresses the inputted variable printing data if this data is written in the archive format, and check if there is any syntax error. After that, processing method is evaluated and the PPML is interpreted.

The image file PDL conversion processing section 202 converts the pages within the scope wherein the image file of the input data has been requested, into the PDL (Page Description Language), which is sent to the PDL layout edit processing section 203.

The PDL layout edit processing section 203 requests the image file PDL conversion processing section 202 to convert the PDL of the required page, and receives that PDL. The position, size and image conversion indication of the parts described in the PPML file is written into the PDL, and the parts are extracted in the PDL format. The extracted parts are superimposed to generate the PDL of the pages having been superimposed. The extracted reusable parts are then stored in the memory and others.

The RIP processing section 204 rasterizes the image file (PDF file) when the processing method for superimposing the rasterized parts (details to be described later) has been selected. Then the image file is written into the frame buffer 208. When the target page includes reusable parts, the relevant parts are extracted in a rectangular form and are stored in the cache memory 209. When the processing method for superimposing in the PDL format (details to be described later) has been selected, the PDL generated by the PDL layout edit processing section 203 is rasterized and is written into the frame buffer 208.

The composite processing section 205 allows the frame buffer 208 to superimpose the reusable parts stored in the cache memory 209 and the temporarily usable parts.

The engine IF section 206 ensures that the page image written into the frame buffer 208 is sent to the output apparatus 30.

The control processing section 207 provides control of the entire processing, including the control of synchronization among various forms of processing and exclusive control.

FIG. 3 shows the configuration of the PPML analysis processing section 201 of FIG. 2. The PPML analysis processing section 201 includes an archive decompression section 201a, PPML grammar/syntax checking section 201b, processing method evaluation section 201c, and PPML, analysis section 201d.

The archive decompression section 201a decompresses the input data if this data has been archived, and converts it into the PPML file and image file (PDF: Portable Document Format).

The PPML grammar/syntax checking section 201b checks the PPML file grammatically and syntactically to find out any error or illegal item in the description of PPML. If any error or illegal item has been detected, the result is outputted to suspend the processing.

In response to the quantity and area of the parts constituting the page, the processing method evaluation section 201c determines whether the processing method for synthesizing the rasterized parts or the processing method for processing in the PDL format should be selected. The processing flow is changed by the result of this decision.

The PPML, analysis section 201d analyzes the PPML and interprets the parts constituting the page, the position and size of the parts, and the type of image conversion to be made.

FIG. 4 is a diagram showing the configuration of the PDL layout edit processing section 203 of FIG. 2. The PDL layout edit processing section 203 includes a PDL data receiving section 203a, coordinate conversion section 203b, crop conversion section 203c, image conversion section 203d, and PDL embedded section 203e.

The PDL data receiving section 203a requests the image file PDL conversion processing section 202 to convert the required page into the PDL format, and receives the data having been converted by the image file PDL conversion processing section 202.

The coordinate conversion section 203b converts the PPML coordinates described in the PPML file, into the PDL coordinates, and makes the position and size of the parts applicable to the PDL.

The crop conversion section 203c ensures that the image crop specified in the PPML file is applied to the PDL, and processing for reproducing the configuration of the appropriate parts in the PDL format is applied to the PDL.

The image conversion section 203d adds the instructions for executing in the PDL format to the image conversion specified by the PPML file. This procedure permits the PDL to be edited in such a way that the same image conversion as that in the PPML format can be achieved in the PDL format.

The PDL embedded section 203e edits the PDL to ensure that all the parts are correctly configured and are appropriately rasterized.

The following describes a comparison between the conventional processing method and the processing method proposed in this Example. FIG. 5 shows the conventional processing method (a method for processing the rasterized parts).

The PPML data 40 as the variable printing data is assumed as including the PPML file 50 and PDF 60 which is an image file. In the PDF 60, one part is arranged on each page, and both the reusable parts and temporarily usable parts assume one and the same format. The page size of each part denotes the size of the completed image 80. In this Example, two reusable parts (71a and 72a) and four temporarily usable parts (73a through 76a) are used to form one variable printing data item.

To create the completed image 80, the required page of the PDF file 60 is RIP-ed. Only the rectangular parts are extracted from the RIP-ed raster data items 71 through 76, and are used as parts to be superimposed on the page. The pages 71 and 72 containing the reusable parts are RIP-ed only once. The required rectangular parts are extracted from the raster data and are stored in the cache memory as reusable parts 71a and 72a. For the second item and thereafter, the cached parts are used. The pages 73 through 76 containing the temporarily usable parts are RIP-ed, and the required rectangular forms are extracted. They are then arranged at the position described in the PPML file 50 as the temporarily usable parts 73a through 76a.

In this Example, 6-page RIPs are needed to generate the one-page completed image 80. The page of the parts is stored in terms of the page size of the completed image 80. The required area is extremely small with reference to the page so that the greater majority of the pages are not used. However, the entire portion of each page must be initialized every time, and the entire page must be rasterized. An increase in the number of pages increases the overhead for RIP-ing of each page. This causes the efficiency to be reduced.

FIG. 6 shows the processing method (processing method of superimposing in the PDL format) proposed in this Example.

Similarly, the PPML data 40 as the variable data is made up of the PPML file 50 and the PDF 60 which is an image file. In the PDF 60, one part is arranged on each page. The page size of each part denotes the size of the completed image 80. To complete one variable printing data item, two reusable parts (61a and 62a) and four temporarily usable parts (63a through 66a) are used.

To create the completed image 80, only the rectangular parts are extracted in the PDL format from the required page (61 through 67) of the PDF file 60. The reusable parts out of the extracted parts (61a through 66a) are stored in the memory or HDD in the extracted PDL format. For the second item and thereafter, the stored extracted parts are used.

The extracted parts (61a through 66a) are superimposed in the PDL format as in the case of the superimposed image 90. Upon completion of the superimposed image 90 of the PDL, the completed image 80 is created by RIP-ing. In this example, only one-page RIP-ing has been performed to generate one-page completed image 80. The number of the RIP operations is reduced to one sixth that in the case where the conventional processing method is used. This effect increases with the number of the parts used.

Figure 7:
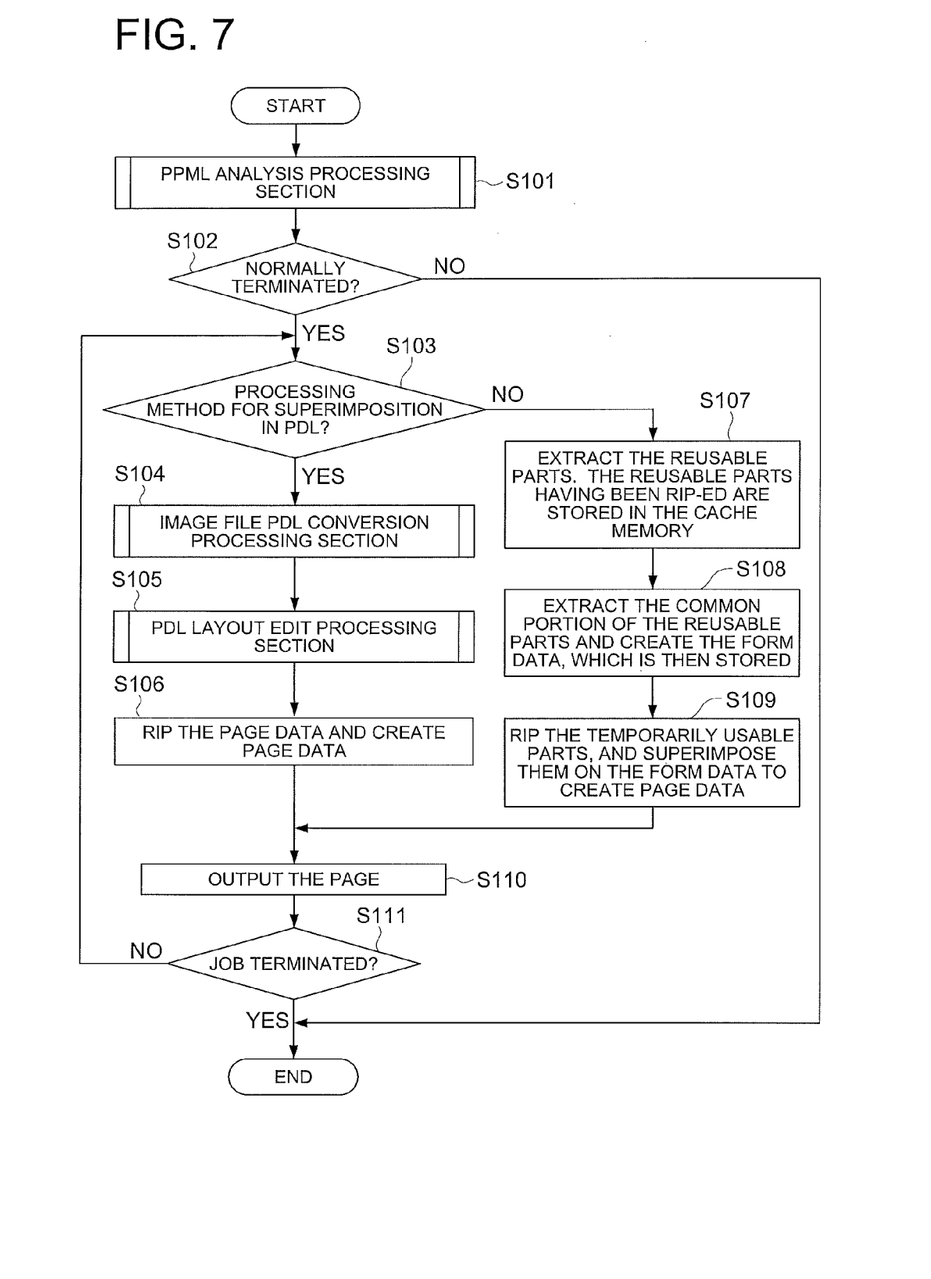
FIG. 7 is a flowchart representing the processing of the variable printing control apparatus in an Example of the present invention.

The following describes a specific case of processing in the variable printing control apparatus 20 of this Example. FIG. 7 is a flow chart showing the processing in the variable printing apparatus 20.

The variable printing control apparatus 20 starts processing after receiving the PPML data which is the variable printing data.

Figure 8:
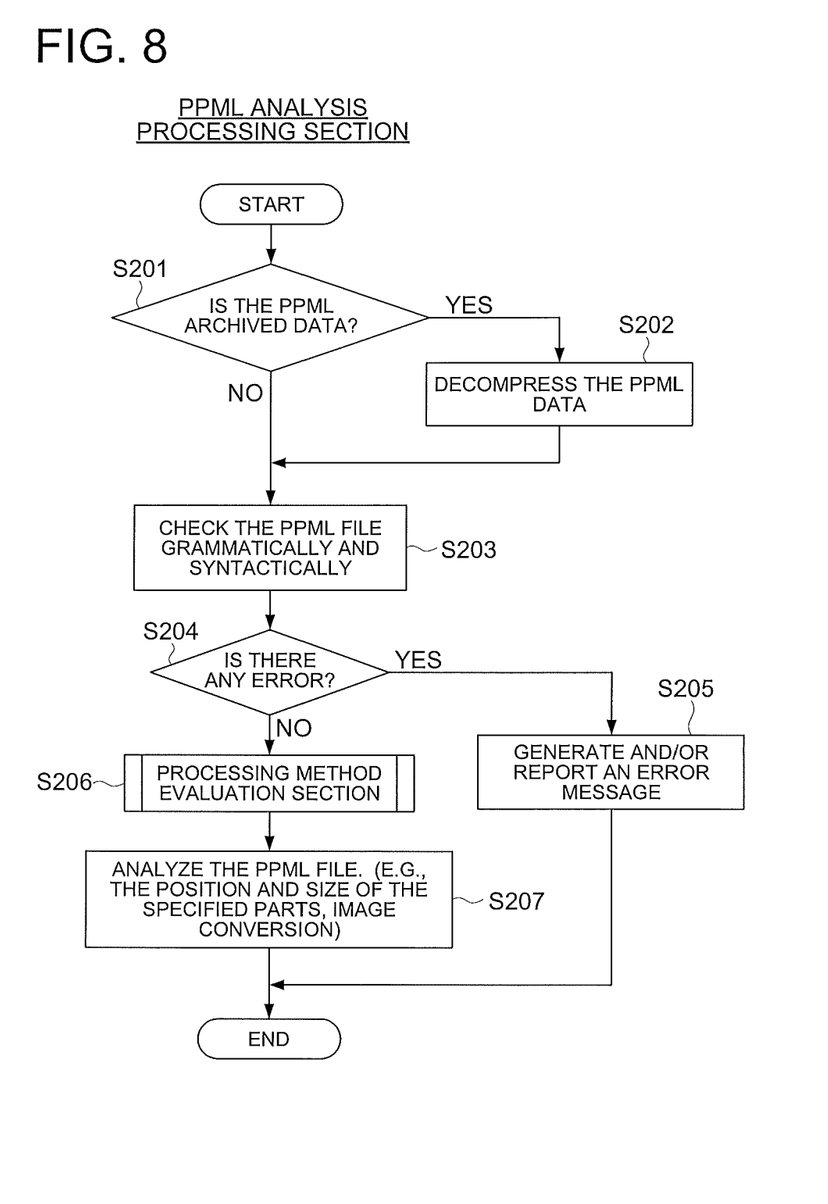
FIG. 8 is a flowchart representing the processing of the PPML analysis processing section in an Example of the present invention.

In the PPML analysis processing section 201, the PPML data is checked to see if there is any grammatical or syntactic error. If there is no error at all, the processing method is evaluated to determine whether the processing method for synthesizing the rasterized parts or the processing method for processing in the PDL format should be selected (S101). FIG. 8 shows the details of the processing in the PPML analysis processing section 201 (details to be described later).

If the PPML analysis processing section 201 fails to terminate correctly (No in S102), an error message is displayed or printed to notify that an error has occurred. Processing then terminates. If the PPML analysis processing section 201 has terminated successfully (without any grammatical and/or syntactic error of PPML) (Yes in S102), processing is divided according to the processing method selected by the PPML analysis processing section 201 (S102).

In the case of the processing method wherein rasterized parts are to be superimposed (No in S103), the reusable parts is RIP-ed and is stored in the cache memory (S107). Then the common portion of the reusable parts is extracted. If it can be used as a form, form data is created and stored (S108). Then the temporarily usable parts are RIP-ed and are superimposed on the created form data, whereby page data is created (S109).

Figure 9:
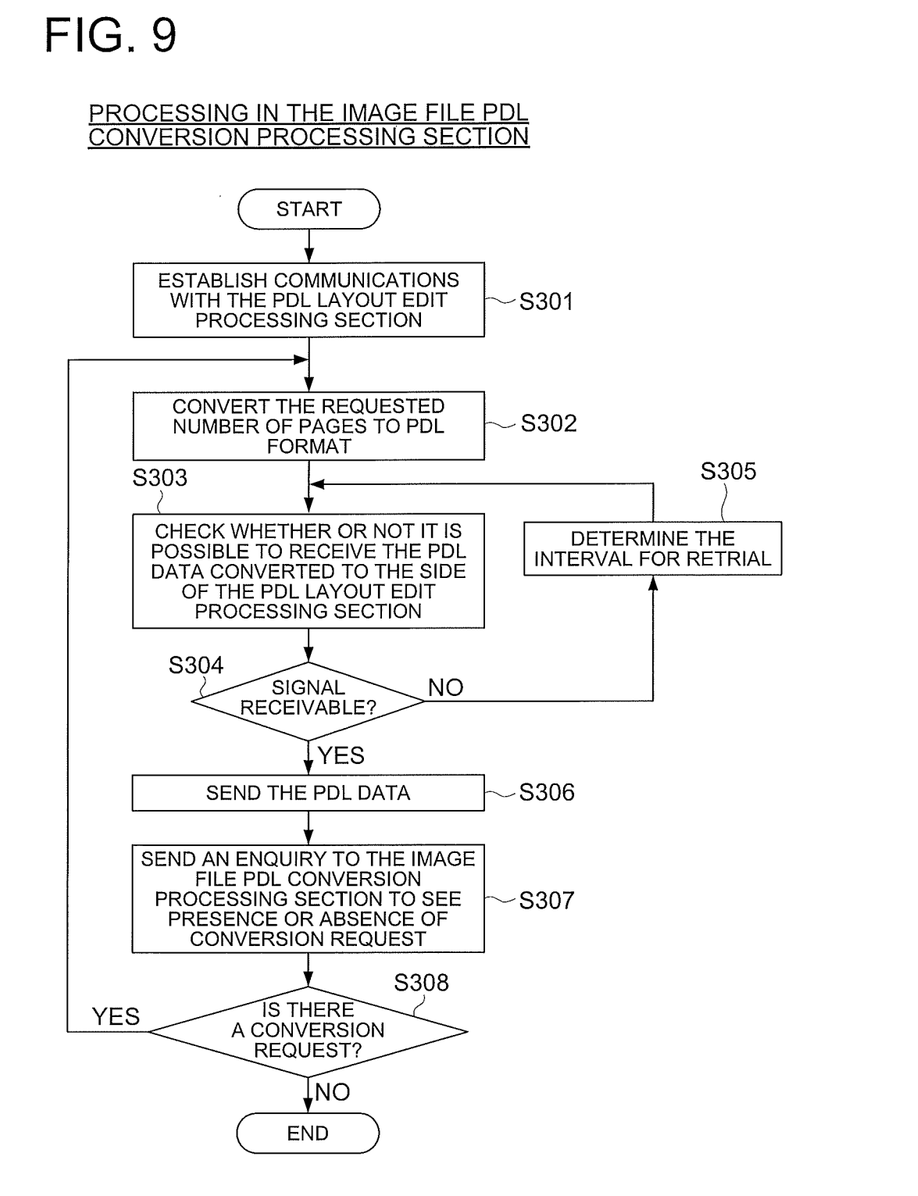
FIG. 9 is a flowchart representing the processing of the image file PDL conversion processing section in an Example of the present invention.
Figure 10:
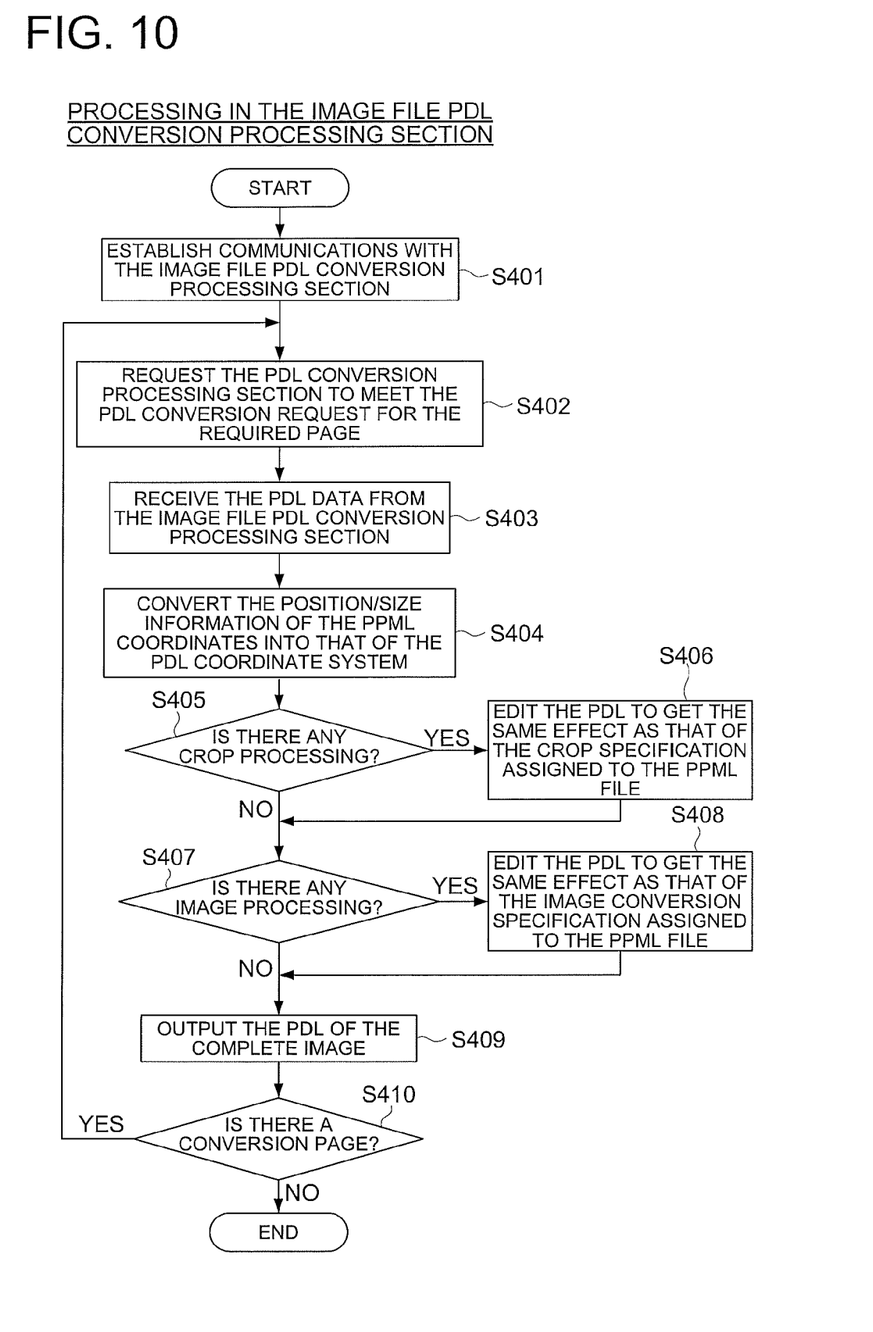
FIG. 10 is a flowchart representing the processing of the PDL layout edit processing section in an Example of the present invention.

When superimposition is performed in the PDL format (Yes in S103), the image file is converted into the PDL by the image file PDL conversion processing section 202 (S104). The converted PDL is laid out, extracted, image-converted and superimposed by the PDL layout edit processing section 203 according to the layout described in the PPML (S105). The superimposed PDL is RIP-ed and to create page data (S106). FIG. 9 shows the details of the processing by the image file PDL conversion processing section 202. FIG. 10 shows the details of the processing by the PDL layout edit processing section 203 (to be described later).

The page data created by either of the two methods is transferred to the output apparatus 30 by the engine I/F section 206 (S110), and is printed by the output apparatus 30. If there is any subsequent job after the page data has been outputted (No in S111), a series of operations from the processing of evaluation in S103 to the processing of page output in S110 are repeated until the job terminates.

[Processing of PPML Analysis Processing Section 201]

FIG. 8 is a flow chart representing the details of the processing (S101 of FIG. 7) in the PPML analysis processing section 201.

PPML analysis processing section 201 determines if the PPML data has been archived or not (S201). If archived, the PPML data is decompressed (S202).

After decompression, the inputted PPML data is checked to see if there is any grammatical or syntactic error (S203). If there is an error (Yes in S204), an error message to that effect is generated, and is reported to the high-order control so that the processing is suspended (S205).

Figure 11:
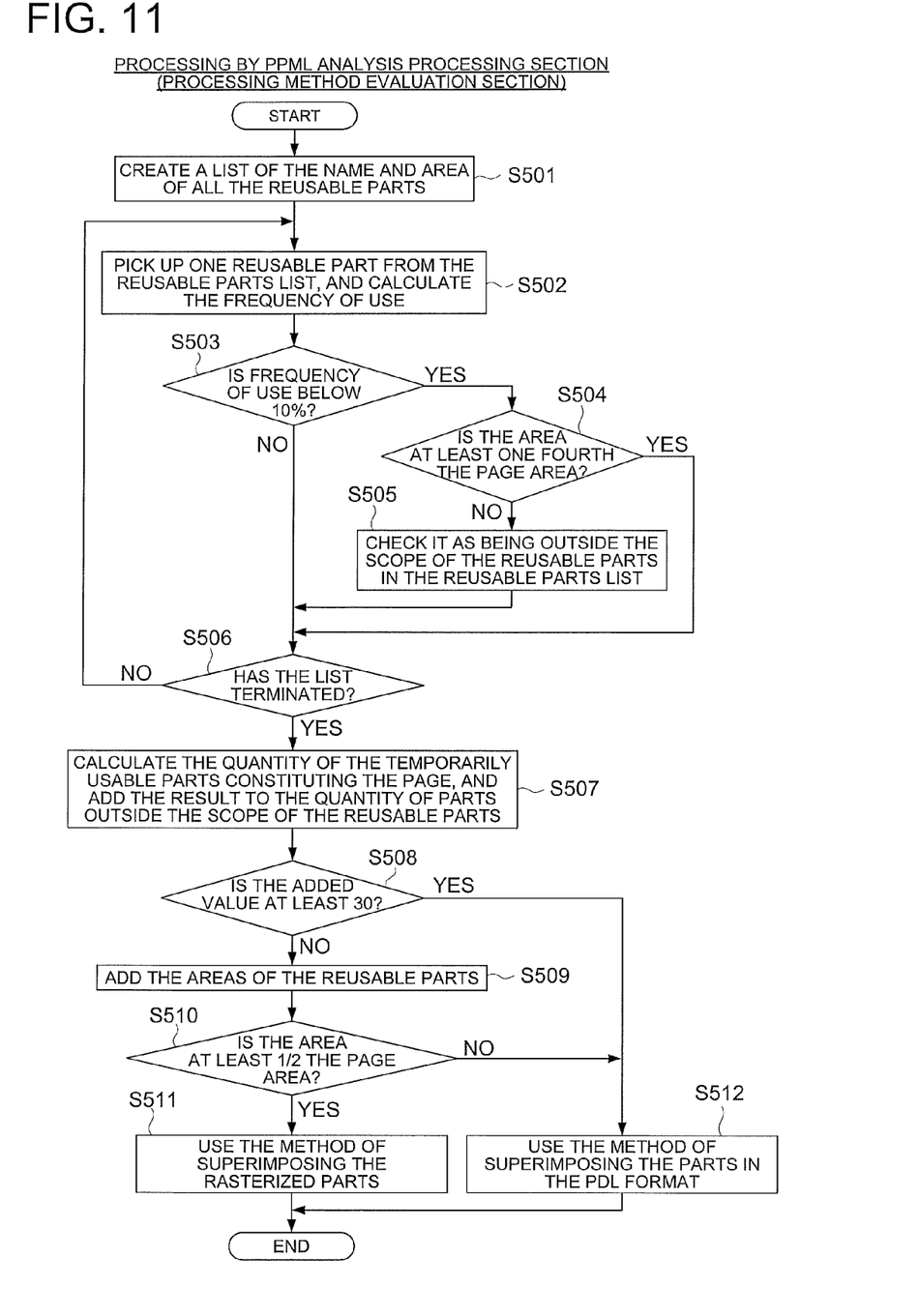
FIG. 11 is a flowchart representing the processing of the processing method evaluation section in an Example of the present invention.

If there is no error (No in S204), the processing method is evaluated by the processing method evaluation section 201c (S206). After evaluation of the processing method has been completed, analysis of the PPML file is executed to completion (S207). FIG. 11 shows the processing of the processing method evaluation section (to be described later).

[Processing of Image File PDL Conversion Processing Section 202]

FIG. 9 is a flow chart showing the details of the processing (S104 of FIG. 7) in image file PDL conversion processing section 202.

The image file PDL conversion processing section 202 establishes communications with the PDL layout edit processing section 203 (S301). The number of pages requested from the PDF layout edit processing section 203 is converted into the PDL (S302). In the next step, the image file PDL conversion processing section 202 asks the PDL layout edit processing section 203 if the converted PDL data can be received or not (S303). If the data cannot be received (No in S304), after intervals for retrying has been set (S305), the image file PDL conversion processing section 202 again asks the PDL layout edit processing section 203 if the data can be received or not. If the data can be received, the converted PDL data is sent to the PDL layout edit processing section 203 (S306).

Upon completion of the PDL data transmission, an inquiry is sent to the PDL layout edit processing section 203 asking whether there is a conversion request or not (S307). If there is a conversion request (Yes in S308), the system goes back to the process of converting into the PDL format the number of the pages requested in S302. Then the processing of conversion is repeated until there is no more PDL conversion request.

[Processing of PDL Layout Edit Processing Section 203]

FIG. 10 is a flow chart showing the details of the processing by the PDL layout edit processing section 203 (S105 of FIG. 7), The PDL layout edit processing section 203 establishes communications with the image file PDL conversion processing section 202 (S401), requests the image file PDL conversion processing section 202 to PDL-convert the required page (S402). Then the PDL layout edit processing section 203 receives PDL from the image file PDL conversion processing section 202 (S403), and converts the coordinate position and size information of PPML in conformity to the PDL coordinate system (S404).

If crop processing is included in the PPML specifications (Yes in S405), the PDL is edited in such a way that the same effect as that of the crop specified in the PPML is obtained with respect to the PDL (S406). If the image conversion processing is included in the PPML specifications (Yes in S407), the PDL is edited in such a way that the same effect as that of the image conversion specified in the PPML is obtained with respect to the PDL (S408). If superimposition has been completed, the results are collectively outputted as one PDL (S409).

Evaluation is made to see whether or not there is any page whose layout is to be converted (S410). The process ranging from the step of sending the PDL page change request to the image file PDL conversion processing section 202 (S402) to the step of PDL-outputting of completed image (S409) is repeated until there is no more page whose layout is to be converted.

[Processing in the Processing Method Evaluation Section 201c]

FIG. 11 is a flow chart showing the details of the processing (S206 of FIG. 8) in the processing method evaluation section 201c.

The processing method evaluation section 201c obtains the names of all the reusable parts, and the width and height of the rectangle from the PPML file and calculates the area of the reusable parts, and creates the list of the names and areas of the reusable parts. Then this list is recorded (S501).

One item of reusable parts is picked up from this list. The frequency of use of the reusable parts in the entire job is then checked, and the frequency of use is calculated (S502). If the frequency of use is below the predetermined value (e.g., 10%) (Yes of S503), evaluation is made to see whether or not the area of the reusable parts is equal to or greater than a prescribed value (e.g., ¼) with respect to the area of the page for the completed image 80 (S504). If it is smaller than ¼, this data is recorded in the list for the parts outside the scope of the reusable parts (S505). This verification procedure is applied to all the reusable parts.

After the list has been completed (Yes in S506), the quantity of the temporarily usable parts constituting the page is calculated. At the same time, the parts outside the scope of the reusable parts are counted, and the quantity of the temporarily usable parts is added to the quantity of the reusable parts outside the scope of the reusable parts (S507). Then evaluation is made to see whether or not the sum is not less than a prescribed value (e.g., 30) (S508). If the sum is below 30, the areas of the parts to be reused are added (S509). Evaluation is made to see whether or not the result of this addition is not less than a prescribed (value e.g., ½) with respect to the area of the page of the completed image 80 (S510). If it is equal to or greater than ½, processing is performed according to the method for superimposition of rasterized parts as shown in FIG. 5 (S511). Otherwise, processing is performed for superimposition in the PDL format as shown in FIG. 6 (S512).

The present Example provides a substantial reduction of the pages to be rasterized, and enhances the processing efficiency for the following reason:

The variable printing control apparatus implements the processing method by selecting between the two methods—a processing method wherein variable printing data is analyzed, the page wherein parts are arranged is rasterized in response to the quantity and area of parts, and the parts are extracted from the raster data and are superimposed; and a processing method wherein parts are extracted from each page in the PDL format and are superimposed, and the page superimposed in the PDL format is rasterized. The latter processing method requires rasterization of only the page superimposed in the PDL format.

The aforementioned arrangement solves the problem of the processing efficiency being reduced by the use of the data which is made up of a greater number of parts with smaller area of the common portion (reusable parts), regarded as being unsuited to variable printing, or the data which is made up of a great number of variable parts (temporarily usable parts).

It is to be expressly understood that the present invention is not restricted to the aforementioned Example. The configuration and control can be embodied in a great number of variations with appropriate modification or additions, without departing from the technological spirit and scope of the invention claimed.

For example, one part to be superimposed is stored for each page in the aforementioned Example. However, a plurality of parts can be stored for a plurality of different pages. Further, in the aforementioned Example, the PPML data is illustrated as the variable printing data. However, other form of data can be used if a variable printing instruction can be used. Further, in the aforementioned Example, the variable printing control apparatus 20 is shown as being capable of implementing both the processing method for superimposing the rasterized parts and the processing method for superimposing the parts in the PDL format It is also possible to arrange such a configuration as to implement only the processing method for superimposing parts in the PDL format.

The present invention applies to a variable printing control apparatus for controlling variable printing operations, and a control program run by the aforementioned apparatus.

What is claimed is:

1. A variable printing control apparatus for creating an image data to be printed, using variable printing data containing a plurality of page data in which one of a plurality of parts is arranged in one page, the variable printing control apparatus comprising:
   an analysis processing section which analyzes the variable printing data and selects a processing method in conformity to a form of the plurality of parts;
   a conversion processing section which converts the page data into PDL data in cases where a specific processing method has been selected;
   an edit processing section which lays out and edits the converted PDL data, and superimposes the plurality of parts in PDL format;
   a RIP processing section which rasterizes the PDL data obtained by superimposing the plurality of parts to create the image data;
   wherein the analysis processing section selects the specific processing method, in cases where a number of temporarily usable parts is not less than a prescribed value, or in cases where the number is less than the prescribed value and a ratio of total area of reusable parts with respect to a page area is less than a prescribed ratio; and
   wherein the analysis processing section specifies, among the reusable parts, a part whose frequency of use is below a prescribed frequency value and whose ratio of area to the page area is below a prescribed ratio value, as a part outside a scope of objective parts, and wherein the analysis processing section selects the specific processing method, in cases where a total number of the number of the temporarily usable parts and the number of the parts outside the scope of objective parts is not less than a prescribed number, or in cases where the total number is less than the prescribed number and a ratio of total added area of the reusable parts in the scope of objective reusable parts with respect to the page area is less than a prescribed ratio.

2. The variable printing control apparatus of claim 1, wherein the variable printing data is PPML data, and wherein the edit processing section converts a coordinate position and size information of the parts described in the PPML data in conformity to a PDL coordinate system, and superimposes the plurality of parts based on the PDL coordinate system.

3. The variable printing control apparatus of claim 1, wherein the variable printing data is PPML data, and wherein the edit processing section converts a coordinate position and size information of the parts described in the PPML data in conformity to a PDL coordinate system, and superimposes the plurality of parts based on the PDL coordinate system.

4. The variable printing control apparatus of claim 1, wherein the variable printing data is PPML data, and wherein the edit processing section converts a coordinate position and size information of the parts described in the PPML data in conformity to a PDL coordinate system, and superimposes the plurality of parts based on the PDL coordinate system.

5. A non-transitory computer-readable storage medium storing therein a control program to control a variable printing for creating an image data to be printed, using variable printing data containing a plurality of page data in which one of a plurality of parts is arranged in one page, the program causing a computer to perform functions of:

an analysis processing section which analyzes the variable printing data and selects a processing method in conformity to a form of the plurality of parts;

a conversion processing section which converts the page data into PDL data in cases where a specific processing method has been selected;

an edit processing section which lays out and edits the converted PDL data, and superimposes the plurality of parts in PDL format;

a RIP processing section which rasterizes the PDL data obtained by superimposing the plurality of parts to create the image data;

wherein the analysis processing section selects the specific processing method, in cases where a number of temporarily usable parts is not less than a prescribed value, or in cases where the number is less than the prescribed value and a ratio of total area of reusable parts with respect to a page area is less than a prescribed ratio; and wherein the analysis processing section specifies, among the reusable parts, a part whose frequency of use is below a predetermined frequency value and whose ratio of area to the page area is below a prescribed ratio value, as a part outside a scope of objective parts, and wherein the analysis processing section selects the specific processing method, in cases where a total number of the number of the temporarily usable parts and the number of the parts outside the scope of objective parts is not less than a prescribed number, or in cases where the total number is less than the prescribed number and a ratio of total area of the reusable parts in the scope of objective parts with respect to the page area is less than a prescribed ratio.

6. The control program of claim 5, wherein the variable printing data is PPML data, and wherein the edit processing section converts a coordinate position and size information of the parts described in the PPML data in conformity to the PDL coordinate system, and superimposes the plurality of parts based on the PDL coordinate system.

7. The control program of claim 5, wherein the variable printing data is PPML data, and wherein the edit processing section converts a coordinate position and size information of the parts described in the PPML data in conformity to the PDL coordinate system, and superimposes the plurality of parts based on the PDL coordinate system.

8. The control program of claim 5, wherein the variable printing data is PPML data, and wherein the edit processing section converts a coordinate position and size information of the parts described in the PPML data in conformity to the PDL coordinate system, and superimposes the plurality of parts based on the PDL coordinate system.

9. A variable printing control apparatus for creating an image data to be printed, using variable printing data containing a plurality of page data in which one of a plurality of parts is arranged in one page, the variable printing control apparatus comprising:

an analysis processing section which analyzes the variable printing data and selects a processing method in conformity to a form of the plurality of parts;

a conversion processing section which converts the page data into PDL data in cases where a specific processing method has been selected;

an edit processing section which lays out and edits the converted PDL data, and superimposes the plurality of parts in PDL format;

a RIP processing section which rasterizes the PDL data obtained by superimposing the plurality of parts to create the image data;

a reusable parts extraction portion that extracts reusable parts of a rasterized page of an image file of the variable printing data and stores the extracted reusable parts in cache memory when another specific processing method has been selected by the analysis processing section;

a temporary parts extraction portion that extracts temporarily usable parts of the rasterized page of the image file of the variable printing data;

an arrangement portion that superimposes the extracted temporarily usable parts in accordance with PPML data contained in the variable printing data to generate image data; and wherein the analysis processing section selects the another specific processing method when a number of temporarily usable parts is less than a prescribed value, or when the number is not less than the prescribed value and a ratio of total area of reusable parts with respect to a page area is not less than a prescribed ratio.

10. The variable printing control apparatus of claim 9 further comprising:

a common parts extractor portion which extracts common portions of the extracted reusable parts;

a form data generator portion which creates a form from the extracted common portions; and wherein the arrangement portion arranges the extracted temporarily usable parts on the created form.

11. A non-transitory computer-readable storage medium storing therein a control program to control a variable printing for creating an image data to be printed, using variable printing data containing a plurality of page data in which one of a plurality of parts is arranged in one page, the program causing a computer to perform functions of:

an analysis processing section which analyzes the variable printing data and selects a processing method in conformity to a form of the plurality of parts;

a conversion processing section which converts the page data into PDL data in cases where a specific processing method has been selected;

an edit processing section which lays out and edits the converted PDL data, and superimposes the plurality of parts in PDL format;

a RIP processing section which rasterizes the PDL data obtained by superimposing the plurality of parts to create the image data;

a reusable parts extraction portion that extracts reusable parts of a rasterized page of an image file of the variable printing data and stores the extracted reusable parts in cache memory when another specific processing method has been selected by the analysis processing section;

a temporary parts extraction portion that extracts temporarily usable parts of the rasterized page of the image file of the variable printing data;

an arrangement portion that superimposes the extracted temporarily usable parts in accordance with PPML data contained in the variable print data to generate image data; and wherein the analysis processing section selects the another specific processing method when a number of temporarily usable parts is less than a prescribed value, or when the number is not less than the prescribed value and a ratio of total area of reusable parts with respect to a page area is not less than a prescribed ratio.

12. The control program of claim 11, the control program further causes the computer to perform functions of:

a common parts extractor portion which extracts common portions of the extracted reusable parts;
a form data generator portion which creates a form from the extracted common portions; and
wherein the arrangement portion arranges the extracted temporarily usable parts on the created form.

* * * * *